United States Patent [19]

Dumbaugh

[11] 3,785,529
[45] Jan. 15, 1974

[54] FLOWABLE MATERIAL STORAGE MEANS

[75] Inventor: George D. Dumbaugh, Louisville, Ky.

[73] Assignee: Vibranetics, Inc., Louisville, Ky.

[22] Filed: Oct. 29, 1971

[21] Appl. No.: 193,675

[52] U.S. Cl............. 222/161, 259/72, 259/DIG. 42
[51] Int. Cl............................................ B65g 65/68
[58] Field of Search........................... 222/161, 196; 259/72, DIG. 42

[56] References Cited
UNITED STATES PATENTS
3,278,081 10/1966 Carter............................. 222/161 X
3,178,068 4/1965 Dumbaugh........................ 222/161

*Primary Examiner*—Robert B. Reeves
*Assistant Examiner*—Thomas E. Kocovsky
*Attorney*—Harry B. O'Donnell, III

[57] ABSTRACT

This invention provides improved means for storing a flowable material. Basically, the storage means provided by the present invention comprises container means for containing a flowable material arranged generally vertically and having a bottom opening through which the material can be discharged, in combination with mounting means for supporting the container means for limited movement relative to its generally vertical axis and drive means for independently first twisting the container means about its generally vertical axis and then moving the container means along that axis such that the material is induced to move within the container means and caused to flow through the bottom discharge opening at a generally uniform rate.

16 Claims, 5 Drawing Figures

PATENTED JAN 15 1974 3,785,529
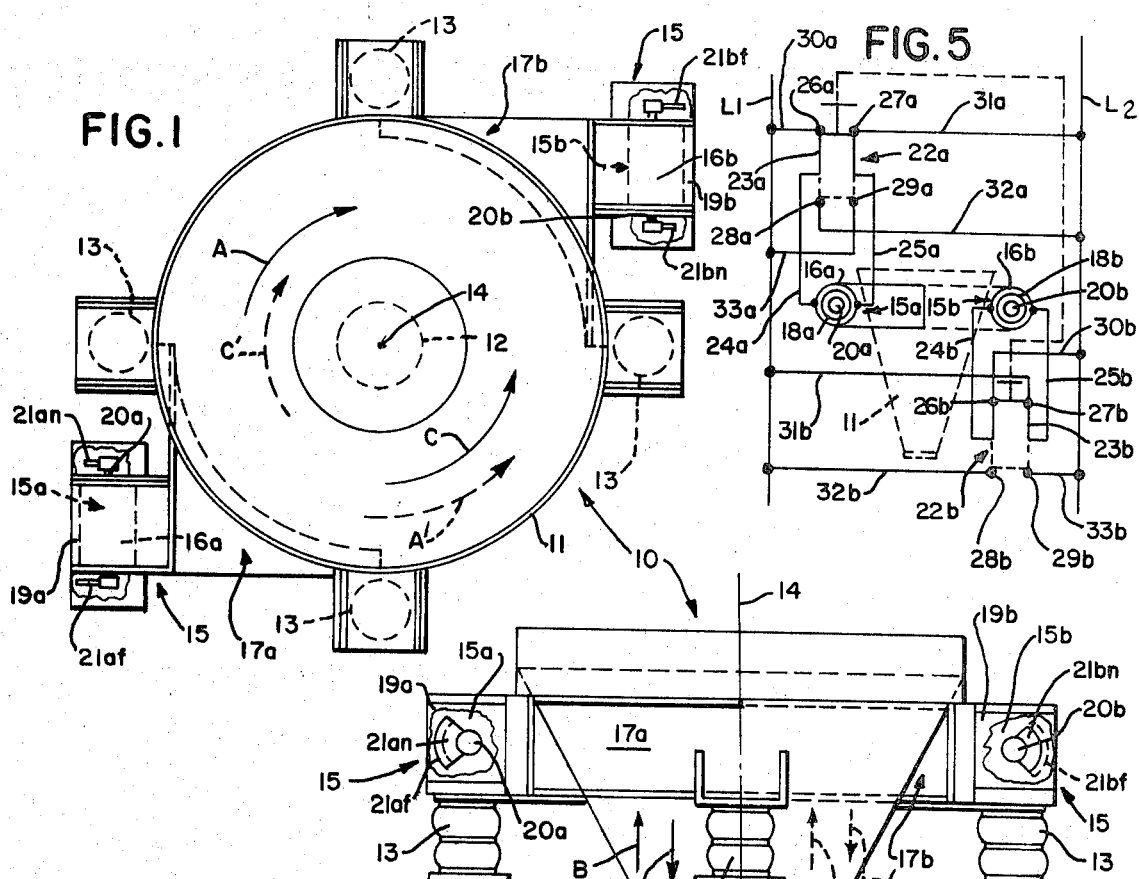
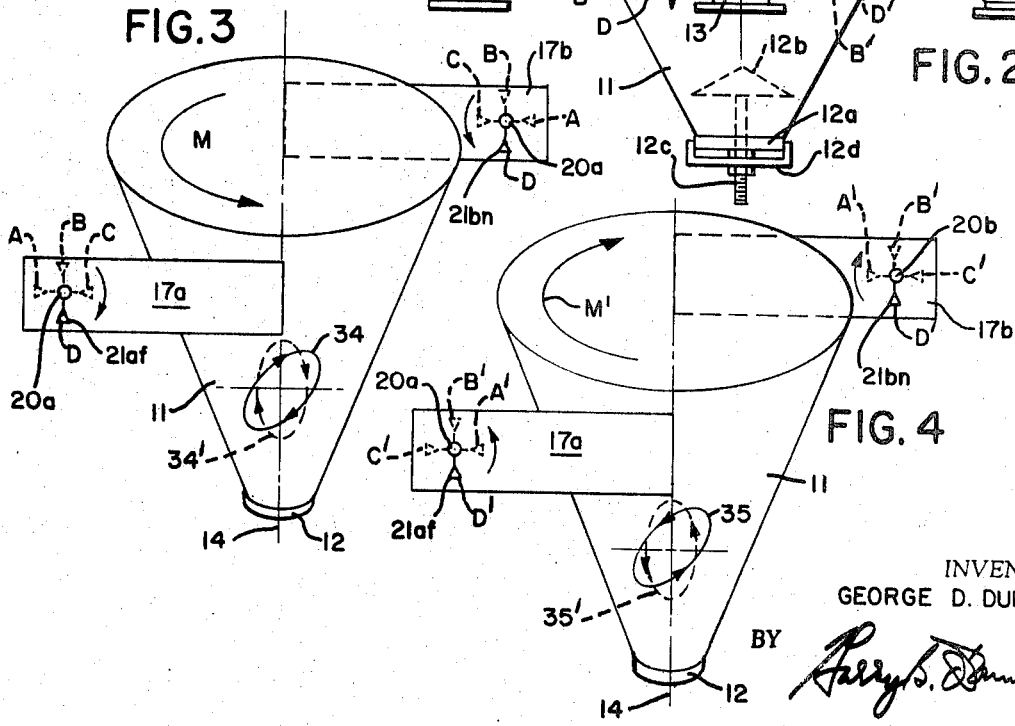
INVENTOR.
GEORGE D. DUMBAUGH
BY
HIS ATTORNEY

FLOWABLE MATERIAL STORAGE MEANS

BACKGROUND OF THE INVENTION

This invention relates to material storage means and, more particularly, to means for storing a flowable material.

In using flowable materials such as granular or fibrous solids or small parts in manufacturing processes, these materials are often supplied to the process from storage means, such as bins, hoppers and like storage vessels. These materials can be supplied from their storage means by gravity, but it is frequently necessary that they be supplied to the manufacturing process at a generally uniform rate.

Since many flowable materials are not always free-flowing, it is often difficult to supply such materials from their storage means at a uniform rate if gravity alone is employed. This is because a flowable material which is not free-flowing tends to bridge and pack in its storage means container, and it is often difficult to discharge such a material from the outlet of its storage container in any form other than in clumps or agglomerations. Furthermore, a finely divided flowable material will often bridge in its storage container temporarily and, subsequently, will then surge through the container discharge outlet in excessive quantity.

Heretofore, various structures have been provided in an attempt to provide flowable material storage means which can overcome the aforenoted problems of non-uniform discharge rate. Typical forms of these prior-art structures are described in detail in U.S. Pat. No. 2,246,497 - Beck and U.S. Pat. No. 3,078,015 - Wahl and in my U.S. Pat. Nos. 3,261,592 and 3,178,068. Of these prior-art devices, perhaps the most successful thus far in overcoming the aforenoted problem of non-uniform discharge rate has been that described in the latter one of my aforementioned two patents, U.S. Pat. No. 3,178,068. However, that structure is, unfortunately, limited in its scope to one employing a drive mechanism for imparting a helical, or screw-like, movement to the material containing vessel wherein the helical movement must have both a vertical component and, simultaneously, another component consisting of oscillation of the vessel about its vertical axis. This particular prior-art structure of mine has the further disadvantage of being somewhat complex and costly in its construction, in that its preferred drive mechanism requires a pair of rotary motors which must have their stators connected to the material container such that their rotors are arranged at rather critical angles with respect to one another and to vertical axis of the storage vessel.

The present invention is concerned with providing flowable material storage means which are improved over prior-art structures in economy and simplicity of construction and ease of operation and maintenance.

SUMMARY OF THE INVENTION

The present invention provides improved means for storing a flowable material. Basically, the storage means provided by the present invention comprises container means for containing a flowable material arranged generally vertically and having a bottom opening through which the material can be discharged, in combination with mounting means for supporting the container means for limited movement relative to its generally vertical axis and drive means for independently first twisting the container means about its generally vertical axis and then moving the container means along that axis such that the material is induced to move within the container means and caused to flow through the bottom discharge opening at a generally uniform rate.

Preferably, the drive means of the present invention comprises two diagonally opposed rotary motors which have their stators connected to the container means and their rotors arranged generally horizontally and carrying weights eccentrically mounted thereon. In this presently preferred arrangement, the container means has a generally circular horizontal cross-section and the stators are connected to the container means by members arranged at a tangent to the container means with the rotors being aligned generally perpendicular to the tangent. With this arrangement, the drive means drive the container means to be first twisted about its generally vertical axis in a first direction, then moved generally upward along that axis, then twisted about that axis in a second direction opposite to the first direction, and then moved generally downward along that axis.

BRIEF DESCRIPTION OF THE DRAWING

The present invention is illustrated in the accompanying drawing, wherein:

FIG. 1 is a somewhat schematic top plan view of a presently preferred form of the improved storage means provided in accordance with the present invention;

FIG. 2 is a side elevational view of the storage means of FIG. 1;

FIG. 3 is a diagrammatic front elevational perspective view of the storage means of FIGS. 1 and 2 illustrating movement of its container means and material contained therein in response to a first condition of operation of its drive means;

FIG. 4 is a view similar to FIG. 3 but illustrating movement of its container means and material contained therein in response to a second condition of operation of its drive means; and FIG. 5 is a schematic diagram of a presently preferred form of control circuit that can be employed with the present invention.

DESCRIPTION OF THE PREFERRED EMBODIMENTS

Referring now to the drawings and, more particularly to FIGS. 1 and 2 thereof, there is illustrated a presently preferred form of improved flowable material storage means 10 provided in accordance with the present invention.

The storage means 10 includes container means for containing a flowable material and comprising a generally vertically arranged hollow frusto-conical storage hopper or bin 11 having a bottom opening 12 through which the material can be discharged, in combination with mounting means, such as the four fluid-filled, flexible, elastomeric bags 13 spaced at 90° angles around its upper outer circumference, that support the container means 11 on a fixed support (not shown) for limited movement relative to its generally vertical central axis 14, and drive means 15 for independently first twisting the container means 11 about its generally vertical central axis 14 and then moving the container means 11 along that axis 14 such that material is induced to move within the container means 11 and caused to flow through the discharge opening 12 at a generally uniform rate.

The container means 11 and the mounting means 13 are generally similar to those described in detail in my aforenoted prior-art U.S. Pat. No. 3,178,068. The frusto-conical storage bin 11 is provided with a short cylindrical skirt 12a which extends downwardly from the bottom opening 12. In order that the discharge flow rate of material from the bin 11 may be adjusted, an inverted conical baffle 12b is mounted on a threaded stem 12c which passes through and is adjustably secured to the bight portion of a U-shaped bracket 12d that is fixed to the skirt 12a (FIG. 2).

The frusto-conical bin 11 constitutes a preferred form of movable vessel for containing the flowable material. However, other forms of movable container vessels may be employed, but the side walls of the movable vessel should be tapered downwardly and inwardly in any event. To obtain satisfactory results, the average slope of the side walls of the container means 11, from the extreme lower end of the volume of material, should be not less than 25° and not more than 75° from the generally vertical axis 14.

On the other hand, the drive means 15 for the present invention is considerably different from the drive means described in my aforenoted prior-art U.S. Pat. No. 3,178,068. As best shown in FIGS. 1 and 2, the drive means 15 of the present invention preferably comprises two diagonally opposed electrically-powered rotary motors 15a and 15b, whereas the drive means motors employed in the preferred form of the U.S. Pat. No. 3,178,068 apparatus are diametrically opposed to one another. The two motors 15a and 15b of the drive means 15 of the present invention have their stators 16a and 16b respectively connected to opposite sides of the upper outer circumference of the container means 11 by two bracket members 17a and 17b that are each arranged at a tangent to the circular horizontal cross-section of the conical container means 11 and fastened thereto, as by welding or other suitable means. The motors 15a and 15b have their rotors 18a and 18b arranged generally horizontally and respectively aligned generally perpendicular to the tangents defined by the two bracket members 17a and 17b which connect their stators 16a and 16b to the container means 11 and to which their stators 16a and 16b are respectively fastened, as by bolts or the like (not shown).

The two motors 15a and 15b are respectively enclosed in sealed housings 19a and 19b that are respectively connected adjacent the distal ends of the two tangentially arranged bracket members 17a and 17b.

The two motor rotors 18a and 18b are respectively mounted on two shafts 20a and 20b. Each of these two shafts 20a and 20b extends generally along the horizontally center line of its respective rotor 18a or 18b and has opposite near and far ends as related to the center 14 of the container means or bin 11. Each of the two motor shafts 20a and 20b is eccentrically loaded by weight means carried thereby and eccentrically mounted thereon.

In particular accordance with the present invention and as best shown in FIGS. 1 and 2, these weight means preferably are removably mounted on the motor shafts 20z and 20b and include far weights 21af and 21bf that are respectively mounted on the far ends of their motor shafts 20a and 20b and near weights 21an and 21bn which are respectively mounted on the near ends of their motor shafts 20a and 20b.

In further accordance with the present invention, the far end weights 21af and 21bf are heavier than the near end weights 21an and 21bn.

Preferably, the two motors 15a and 15b are of a type wherein rotation of their rotors 18a and 18b can be reversed. And, as best shown in FIG. 5, the motor stators 16a and 16b have their windings electrically connected across a source of electrical power, comprising first and second power supply lines L1 and L2, through control means, such as two mechanically interconnected double pole, double throw electric switches 22a and 22b to permit ready reversal of rotation of their rotors 18a and 18b.

More specifically, one of the two switches 22a is provided with a pivoted bridge member 23a that is connected in electrical series with the windings of one of the motor stators 16a by a pair of conductors 24a and 25a. The bridge member 23a is pivotal between a first position, illustrated in solid lines in FIG. 5, wherein it engages a first pair of contacts 26a and 27a of the switch 22a and a second position, shown in shadow lines in FIG. 5, wherein it engages a second pair of contacts 28a and 29a of the switch 22a. The switch contact 26a is electrically connected to the first power line L1 by a conductor 30a and the switch contact 27a is electrically connected to the second power line L2 by another conductor 31a. On the other hand, the switch contact 28a is connected to the second power line L2 by a conductor 32a and the switch contact 29a is connected to the first power line L1 by another conductor 33a.

The other one of two switches 22b has a pivoted bridge member 23b that is connected in electrical series with the windings of the other one of the motor stators 16b by a pair of conductors 24b and 25b. This other bridge member 23b is pivotal between a first position, illustrated in solid lines in FIG. 5, wherein it engages a first pair of contacts 26b and 27b of the second switch 22b and a second position, shown in shadow lines in FIG. 5, wherein it engages a second pair of contacts 28b and 29b of the second switch 23b. The switch contact 26b is connected to the second power line L2 by a conductor 30b and the switch contact 27b is connected to the first power line L1 by another conductor 31b. On the other hand, the switch contact 28b is connected to the first power line L1 by a conductor 32b and the switch contact 29b is connected to the second power line L2 by another conductor 33b.

With the bridge members 23a and 23b of the two switches 22a and 22b being located in their first positions as illustrated in solid lines in FIG. 5, respectively engaging switch contacts 26a, 27a and 26b, 27b, the windings of the two drive means motor stators 16a and 16b will be electrically connected across the power supply lines L1 and L2 such that the motor rotors 18a and 18b and their shafts 20a and 20b will be caused to operate in a first operating condition as diagrammatically illustrated in FIG. 3.

In this first operating condition, as shown in FIG. 3, the two rotor shafts 20a and 20b will be caused to rotate in opposite directions to one another. As viewed from the front side of the container means 11, the front one of the two rotor shafts 20a will be rotated in a clockwise direction, while the other or rear shaft 20b will be rotated in a counter-clockwise direction.

In this first operating (FIG. 3) condition, the weights 21af, 21an and 21bf and 21bn that are respectively carried by the rotating shafts 20a and 20b will be rotated from their rest positions D (shown in solid lines) first away from the container means 11 to their first positions A (shown in shadow lines), wherein they will cause the container means 11 to be twisted about its generally vertical axis 14 in a first or clockwise direction as viewed by the top of the container means 11 and indicated by solid arrow A in FIG. 1. Then, the weights 21af, 21an and 21bf, 21bn will be moved upward to their second positions B (also shown in shadow lines), causing the container means 11 to be moved generally upward along the axis 14, as indicated by the solid arrow B in FIG. 2, independently of the clockwise twisting movement. Then the weights 21af, 21an and 21bf, 21bn will be moved toward the container means 11 to their third positions C (also shown in shadow lines), causing the container means 11 to be twisted about the axis 14 in a counter-clockwise direction as viewed from the top of the container means 11 and as shown by the solid arrow C in FIG. 1 independently of the movement along the axis 14. Then the weights 21af, 21an and 21bf, 21bn will be moved downward to their fourth positions D, causing the container means 11 to be moved generally downward along the axis 14, as indicated by the solid arrow D in FIG. 2, independently of the counter-clockwise twisting movement. This first operational condition rotation of the weights 21af, 21an and 21bf, 21bn through their four positions A, B, C and D and the resultant movement of the container means 11 caused by it will, of course, continue until such time as the rotation of shafts 20a and 20b is stopped, as by de-energizing the power supply by moving the switch bridge members 23a and 23b to a neutral position. Upon such de-energization, it sould be understood, of course, that gravity will cause the weights 21af, 21an and 21bf, and 21bn to return to their fourth or rest positions D.

As further shown in FIG. 3, this first condition of operation will cause the container means 11 to be moved about its generally vertical axis 14 in a generally elliptical pattern in a clockwise direction as viewed from the top of the container means 11. The elliptical pattern will be slightly cocked with respect to the axis 14, as shown by a solid line ellipse 34 in FIG. 3, because the far end weights 21af, 21bf and the near end weights 21an, 21bn are of unequal mass. It should, however, be understood that if all four of these weights 21af, 21bf, and 21an and 21bn were made of equal mass, the pattern of movement of the container means 11 about the axis 14 would be generally clockwise as viewed from the top of the container means 11 along an elliptical path illustrated by a shadow line ellipse 34' in FIG. 3 wherein the ellipse 34' generally parallels the axis 14. And, as further shown by arrow M in FIG. 3, this first operating condition will induce material contained with container means 11 to move within the container means 11 in a generally counter-clockwise direction as viewed from the top of the container means 11.

In accordance with a particularly important aspect of the present invention, rotation of the two rotor shafts 20a and 20b can be easily reversed merely by moving the two mechanically interconnected switch bridge members 23a and 23b from their first positions, as shown in solid lines in FIG. 5, to their second positions, as shown in shadow lines in FIG. 5. When the bridge members 23a and 23b are in these second positions, respectively engaging switch contacts 28a, 29a and 28b, and 29b, the windings of the two drive means motor stators 16a and 16b will then be electrically connected across the first and second power supply lines L1 and L2 such that the drive means motor rotors 18a and 18b and their shafts 20a and 20b will be caused to operate in a second operating condition, as diagrammatically illustrated in FIG. 4.

In this second operating condition, as shown in FIG. 4, the two rotor shafts 20a and 20b will also be rotated in opposite directions to one another. As viewed from the front side of the container means 11, the front one of the two rotor shafts 20a will be rotated in a counter-clockwise direction, while the other or rear rotor shaft 20b will be rotated in a clockwise direction.

In this second operating condition (FIG. 4), the weights 21af, 21an and 21bf, 21bn that are respectively carried by the rotating shafts 20a and 20b will be rotated from their rest positions D' (shown in solid lines) first toward the container means 11 to their first positions A' (shown in shadow lines), wherein they will cause the container means 11 to be twisted about its generally vertical axis 14 in a first or counter-clockwise direction as viewed from the top of the container means 11 and as indicated by shadow arrow A' in FIG. 1. Then the weights 21af, 21an and 21bf, 21bn will be moved upward to their second positions B' (also shown in shadow lines), causing the container means 11 to be moved generally upward along the axis 14, as indicated by shadow arrow B' in FIG. 2, independently of the counter-clockwise twisting movement. Then the weights 21af, 21an and 21bf, 21bn will be moved away from the container means 11 to their third positions C' (also shown in shadow lines), causing the container means 11 to be twisted about the axis 14 in a clockwise direction as viewed from the top of the container means 11 and shown by shadow arrow C' in FIG. 1, independently of the movement along the axis 14. Then the weights 21af, 21an and 21bf, 21bn will be moved generally downward along the axis 14, as indicated by the shadow arrow D' in FIG. 2, independently of the clockwise twisting movement. This second operational condition rotation of the weights 21af, 21an and 21bf, 21bn through their four positions A', B', C' and D' and the resultant movement of the container means 11 caused by it will, of course, continue until such time as rotation of the shafts 20a and 20b is stopped, as by de-energizing the power supply by moving the switch bridge members 23a and 23b to a neutral position. Upon such de-energization, it should be understood, of course, that gravity will cause the weights 21af, 21an and 21bf, 21bn to return to their fourth or rest positions D'.

As further shown in FIG. 4, the second condition of operation will cause the container means 11 to be moved about its generally vertical axis 14 in a generally elliptical pattern in a counter-clockwise direction as viewed from the top of the container means 11. This elliptical pattern will be slightly cocked with respect to the axis 14, as shown by a solid line ellipse 35 in FIG. 4, because the far end weights 21af, 21bf and the near end weights 21an, 21bn are of unequal mass. It should, however, be understood that if all four of these weights 21af, 21an, 21bf and 21bn were made of equal mass, the pattern of movement of the container means 11 about the axis would be generally counter-clockwise as viewed from the top of the container means 11 along an elliptical path illustrated by shadow line ellipse 35' in FIG. 4 wherein the ellipse 35' generally parallels the axis 14. And, as further shown by arrow M' in FIG. 4, this second operating condition of the drive means 15 will induce material contained within the container means 11 to move within the container means 11 in a generally clockwise direction as viewed from the top of the container means 11.

Thus, by merely moving the switch bridge members 23a and 23b from one of their two positions illustrated in FIG. 5 to the other of such positions, it is possible with the present invention to readily reverse the direction of drive means induced movement of the material within the container means 11. This feature is particularly advantageous in breaking up any material bridging or clogging which may occur.

When operated in either of the two aforedescribed operating conditions (FIG. 3 or FIG. 4), the drive means 15 of the present invention will, during each full rotation of the motor rotor shafts 20a and 20b drive the container means 11 to be independently first twisted about its generally vertical axis 14 in a first direction, then moved generally upward along the axis 14, then twisted about the axis 14 in a second direction opposite to the first direction, and then moved generally downward along the axis 14.

Preferably the rotational frequencies of the rotor shafts 20a and 20b are substantially identical to one another. Such frequencies, and consequently the vibrational frequency of the container means 11, preferably are not more than 2,000 revolutions per minute nor less than 400 revolutions per minute.

In order that the flexible mounting means 13 may satisfactorily perform their function of minimizing transmission of vibratory forces into the foundation (not shown) on which the apparatus is supported by them, the natural frequency of the apparatus consisting of the mounting means 13 and the mass supported thereon preferably is substantially below the frequency at which the container means 11 is vibrated or driven by the drive means 15.

It should be apparent that while there have been described what are presently considered to be presently preferred embodiments of the present invention in accordance with the Patent Statutes, changes may be made in the disclosed apparatus without departing from the true spirit and scope of this invention. For example, it is possible to employ in place of the flexible elastomeric bags 13 any other type of mounting that provides the container means 11 with a limited freedom of movement relative to the generally vertical axis 14. More specifically, the container means 11 might be hung or supported upon springs. It is, therefore, intended that the appended claims shall cover such modifications and applications that may not depart from the true spirit and scope of the present invention.

What is claimed is:

1. Improved means for storing a flowable material, comprising:
    a. container means for containing said material,
    b. said container means being arranged generally vertically and having a bottom opening through which said material can be discharged;
    c. mounting means for supporting said container means for limited movement relative to its generally vertical axis; and
    d. drive means for independently first twisting said container means about said axis and then moving said container means along said axis such that said material is induced to move within said container means and caused to flow through said opening,
    e. said drive means driving said container means to be:
        i. first twisted about said axis in a first direction;
        ii. then moved generally upward along said axis;
        iii. then twisted about said axis in a second direction opposite to said first direction; and
    d. iv. then moved generally downward along said axis.

2. The invention of claim 1, wherein, as viewed from the top of said container means:
    a. said first direction is clockwise;
    b. said second direction is counterclockwise; and
    c. the direction of the movement of said material induced by said drive means is generally counterclockwise about said axis.

3. The invention of claim 1, wherein, as viewed from the top of said container means:
    a. said first direction is counterclockwise;
    b. said second direction is clockwise; and
    c. the direction of the movement of said material induced by said drive means is generally clockwise about said axis.

4. The invention of claim 1, wherein said drive means comprises two diagonally opposed rotary motors having their stators connected to said container means and having their rotors arranged generally horizontally and carrying weights eccentrically mounted thereon.

5. The invention of claim 4 wherein:
    a. said container means has a generally circular horizontal cross-section; and
    b. said stators are connected to said container means by members arranged at a tangent to said container means with said rotors being arranged generally perpendicular to said tangent.

6. The invention of claim 5, wherein:
    a. each of said rotors is mounted on a shaft having opposite near and far ends as related to the center of said container means; and
    b. said weights include a weight mounted at each of said opposite ends of said shafts with the weights mounted at said far ends being heavier than those mounted at said near ends.

7. The invention of claim 5, wherein the rotation of said rotors can be reversed.

8. The invention of claim 7, wherein said control means can be set to cause said weights to be rotated:
    a. first away from said container means:
    b. then upward;
    c. then toward said container means; and
    d. then downward.

9. The invention of claim 7, wherein said control means can be set to cause said weights to be rotated:
    a. first toward said container means;
    b. then upward;
    c. then away from said container means; and
    d. then downward.

10. The invention of claim 7, further including control means for controlling said rotors to rotate in opposite directions to one another.

11. The invention of claim 5, wherein said motors can be operated to rotate said rotors in opposite directions to one another.

12. The invention of claim 11, wherein:
a. each of said rotors is mounted on a shaft having opposite near and far ends as related to the center of said container means; and
b. said weights include a weight mounted at each of said opposite ends of said shafts with the weights mounted at said far ends being heavier than those mounted at said near ends.

13. The invention of claim 11, wherein said rotors can be rotated to cause said weights carried by them to be rotated:
a. first away from said container means;
b. then upward;
c. then toward said container means; and
d. then downward.

14. The invention of claim 13, wherein:
a. each of said rotors is mounted on a shaft having opposite near and far ends as related to the center of said container means; and
b. said weights include a weight mounted at each of said opposite ends of said shafts with the weights mounted at said far ends being heavier than those mounted at said near ends.

15. The invention of claim 11, wherein said rotors can be rotated to cause said weights carried by them to be rotated:
a. first toward said container means;
b. then upward;
c. then away from said container means; and
d. then downward.

16. The invention of claim 15 wherein:
a. each of said rotors is mounted on a shaft having opposite near and far ends as related to the center of said container means; and
b. said weights include a weight mounted at each of said opposite ends of said shafts with the weights mounted at said far ends being heavier than those mounted at said near ends.

* * * * *